United States Patent [19]
Kobrehel

[11] 3,899,151
[45] Aug. 12, 1975

[54] VEHICLE SEAT ATTACHMENT DEVICE
[75] Inventor: Peter M. Kobrehel, Warren, Mich.
[73] Assignee: General Motors Corporation, Detroit, Mich.
[22] Filed: Nov. 13, 1974
[21] Appl. No.: 523,219

[52] U.S. Cl. .................... 248/429; 292/41; 308/3.9
[51] Int. Cl.[2] ...................................... F16M 13/00
[58] Field of Search ............ 211/182; 248/239, 250, 248/298, 416, 419, 420, 424, 425, 429, 430; 292/33, 41; 308/3 R, 3.5, 3.6, 3.9, 15; 403/11, 106, 315, 316

[56] References Cited
UNITED STATES PATENTS

| | | | |
|---|---|---|---|
| 1,290,982 | 1/1919 | Haigh | 211/182 X |
| 2,639,042 | 5/1953 | Lambert et al. | 211/182 X |
| 2,780,501 | 2/1957 | Rosenberg | 248/430 X |
| 2,964,093 | 12/1960 | Lohr et al. | 248/429 |
| 3,624,703 | 11/1971 | Pavek | 248/239 X |
| 3,702,179 | 11/1972 | Radke et al. | 248/430 |
| 3,806,191 | 4/1974 | Stegmaier | 248/429 X |

*Primary Examiner*—Roy D. Frazier
*Assistant Examiner*—Lawrence J. Staab
*Attorney, Agent, or Firm*—C. E. Leahy

[57] ABSTRACT

The lower track of a vehicle seat adjuster has a headed stud projecting laterally therefrom which is received in an upwardly opening slot on a floor mounted bracket when the vehicle seat and seat adjuster are lowered onto the bracket. A slide lock member slidably mounted on the bracket has a normal unlatched position permitting entry of the headed stud into the slot. The upper track of the seat adjuster has a drive tab thereon which is engageable with the slide lock member to move the slide lock member to latched position capturing the headed stud in the slot. Cam surfaces on the upper and lower edges of the slide lock member cause the slide lock member to be wedged between the shank of the headed stud and a hold down tab of the mounted bracket. The slide lock member is bent to provide an apex which engages the head of the stud causing the slide lock members to be wedged between the head of the stud and the mounting bracket.

3 Claims, 3 Drawing Figures

PATENTED AUG 12 1975  3,899,151

VEHICLE SEAT ATTACHMENT DEVICE

The invention relates to a motor vehicle seat and more particularly to a seat attachment device for facilitating installation of the seat in the vehicle.

Vehicle seats conventionally include a seat adjuster having an upper track attached to the vehicle seat and a lower track attached to the vehicle floor. The attachment of the lower track to the floor requires installation of a bolt or bolt and nut. Such installation can be very difficult and time consuming particularly with respect to attachment of the inboard lower track of a seat adjuster for a bucket seat.

The present invention provides a vehicle seat attachment device which is bolted to the vehicle floor and onto which the seat and seat adjuster are lowered. The lower track of the seat adjuster has laterally projecting headed studs thereon which are received in upwardly opening slots in a mounting bracket attached to the floor pan. A slide lock member slidably mounted on the mounting bracket adjacent each of the slots has an unlatched position in which the slide lock member opens the upwardly opening slot to permit the seat adjuster to be lowered onto the mounting bracket with the shank of the headed stud received in the upwardly opening slot. A drive tab on the upper track of the seat adjuster is engageable with the slide lock member to move the slide lock member to a latched position when the upper track member is moved to its fully adjusted position on the lower track. In latched position, a blocking portion of the slide lock member engages the shank of the headed stud to capture the headed stud in the upwardly opening slot. The blocking portion on the slide lock member has cam surfaces on its upper and lower edges. A lead-in cam surface on the lower edge acts on the shank of the headed stud to guide the slide lock member over to the stud and then a locking cam surface contiguous to the lead-in cam surface engages the shank to capture it in the slot. A hold down tab on the mounting bracket is engaged by a lead-in cam surface on the upper edge of the blocking member causing the blocking portion to be wedged into engagement between the hold down tab and the shank of the headed stud. The blocking portion of the slide lock member is bent to provide an apex for engaging the head of the headed stud to in turn forcibly engage the blocking portion between the head of the stud and the mounting bracket whereby the slide lock member is frictionally locked in the latched position.

One feature of the invention is a seat attachment device which receives the lower track of the seat adjuster and latches the lower track of the seat adjuster to the vehicle floor pan when the seat and the upper track of the seat adjuster are adjusted to their fully adjusted position.

Another feature of the invention is a vehicle seat attachment device wherein a slide lock member captures an adjuster track mounted headed stud in a slot and the slide lock member has cam surfaces causing the slide lock member to be wedged between the headed stud and the mounting bracket.

These and other objects, features and advantages of the invention will become apparent upon consideration of the specification and the appended drawings in which.

Figure 1:
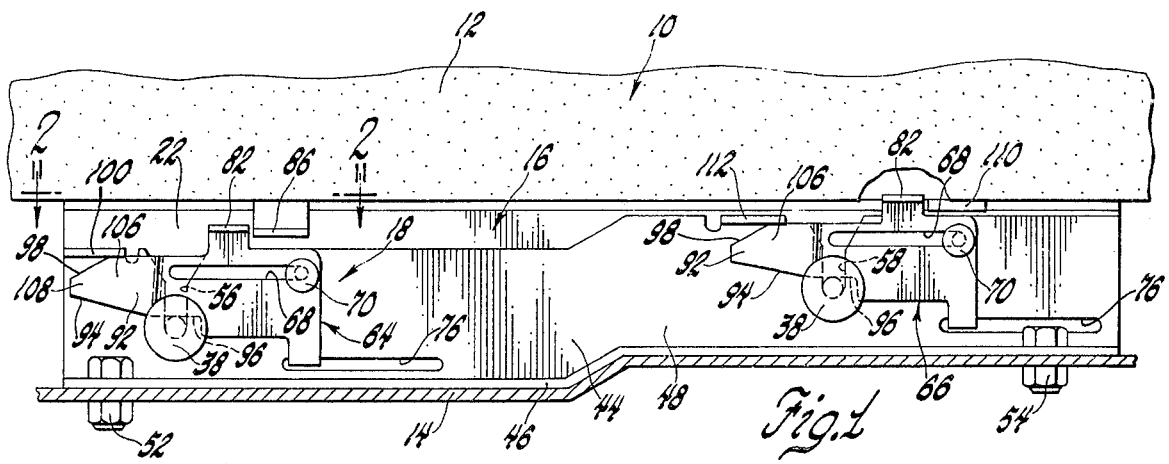
FIG. 1 is a side elevation view of a seat attachment device according to the invention.

Referring to FIG. 1, a vehicle seat indicated generally at 10 has a seat bottom 12. The seat bottom 12 is attached to a vehicle floor pan 14 by a seat adjusting device indicated generally at 16 and an attachment device indicated generally at 18.

Figure 3:
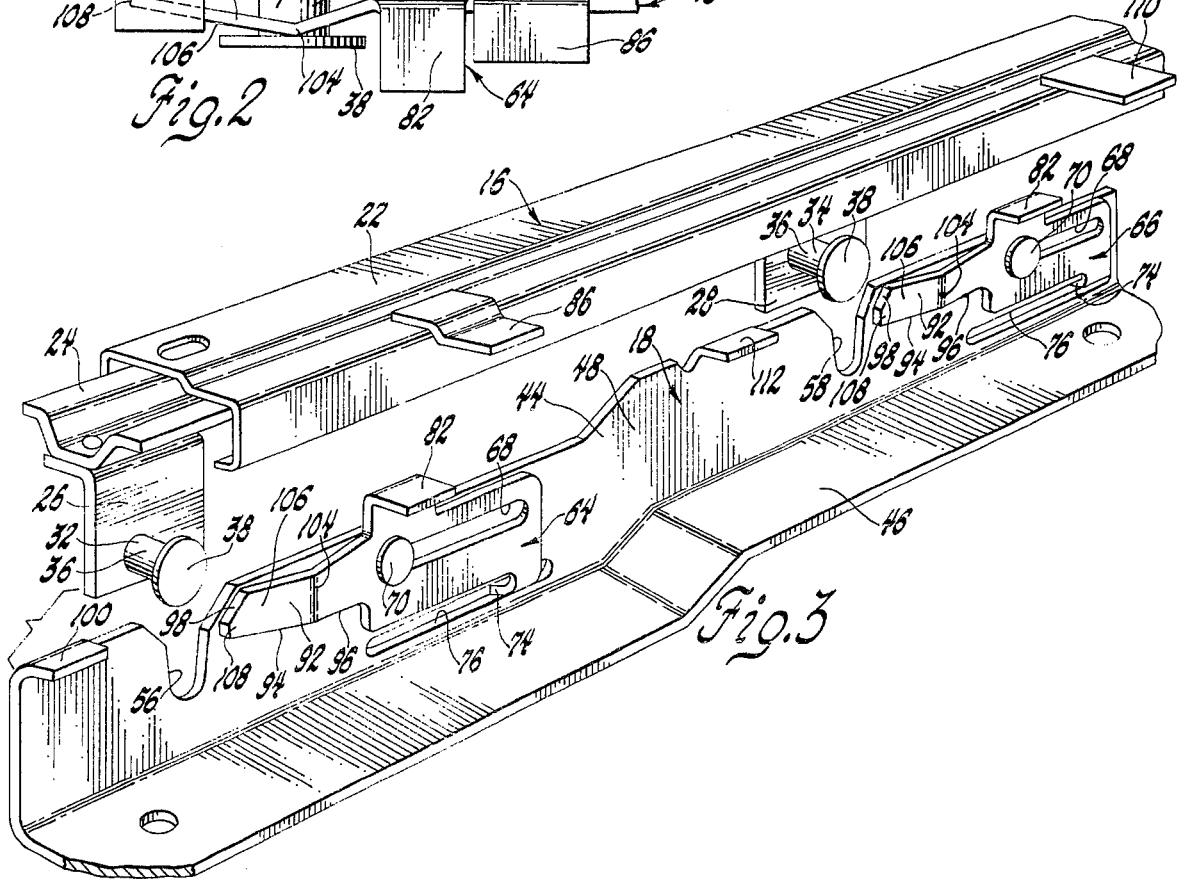
FIG. 3 is an exploded view showing the seat attachment device prior to attachment.

The seat adjusting device 16 is best shown in FIG. 3 and includes an upper track 22 and a lower track 24. The upper track 22 is generally channel shaped and its legs surround and capture the lower track 24. Conventional bearings or bushings, not shown, may be provided to act between the upper track 22 and lower track 24 to provide frictionless fore and aft movement of the upper track 22 on the lower track 24. The upper track 22 is bolted to the seal bottom 12. The lower track 24 has downwardly extending legs 26 and 28 attached thereto in longitudinally spaced relation. The legs 26 and 28 have respective headed studs 32 and 34 extending laterally therefrom. Each of the headed studs includes a shank portion 36 and a head portion 38.

The seat attachment device 18 includes a mounting bracket 44 having a base 46 and an upstanding leg 48. The base 46 of the mounting bracket 44 is bolted to the floor pan 14 by nut and bolt assembly 52 and 54 as shown in FIG. 1. The upstanding leg 48 of the mounting bracket has a pair of upwardly opening slots 56 and 58 located therein at the same longitudinal spacing as that of the headed studs 32 and 34 so that the seat adjuster assembly 16 may be lowered from its position of FIG. 3 into the position of FIG. 1 wherein the headed studs 32 and 34 are respectively received in the upwardly opening slots 56 and 58 of the mounting bracket 44. The slots 56 and 58 are widened at their top so as to facilitate entry of the headed studs 32 and 34. During such lowering of the seat adjusting assembly 16 onto the mounting bracket 44 the upper track 22 is adjusted forwardly relative to the lower track 24 for reasons which will be discussed hereinafter.

Slide lock members 64 and 66 are provided on the mounting bracket 44 adjacent the upwardly opening slots 56 and 58. The structural feature and operation of slide lock member 64 will be described, it being apparent that slide lock member 66 is identically constructed and has like elements designated by like numerals. As best seen in FIG. 3, the slide lock member 64 has an elongated slot 68 therein which slidably receives the shank portion of a headed stud 70 attached to the upstanding leg 48 of the mounting bracket 44. The head of headed stud 70 retains the slide lock member 64 in close proximity to the upstanding leg 48. Slide lock member 64 also has a depending lateral projection 74 which extends slidably through an elongated slot 76 provided in the upstanding leg 48. It will be apparent that the slide lock member 64 is movable fore and aft on the mounting bracket 44 as guided by the path of slots 68 and 76. The slide lock member 64 also has an upstanding lateral projection 82 which, when the seat adjuster assembly 16 is lowered onto the attachment device 18, is generally aligned in the vertical with a laterally projecting drive tab 86 attached to the upper track 22. Accordingly, as the upper track 22 is adjusted rearwardly relative the lower track 24, the drive tab 86 engages the upstanding lateral projection 82 of the slide lock member 64 to move the slide lock member 64 rearwardly on the mounting bracket 44.

Figure 2:
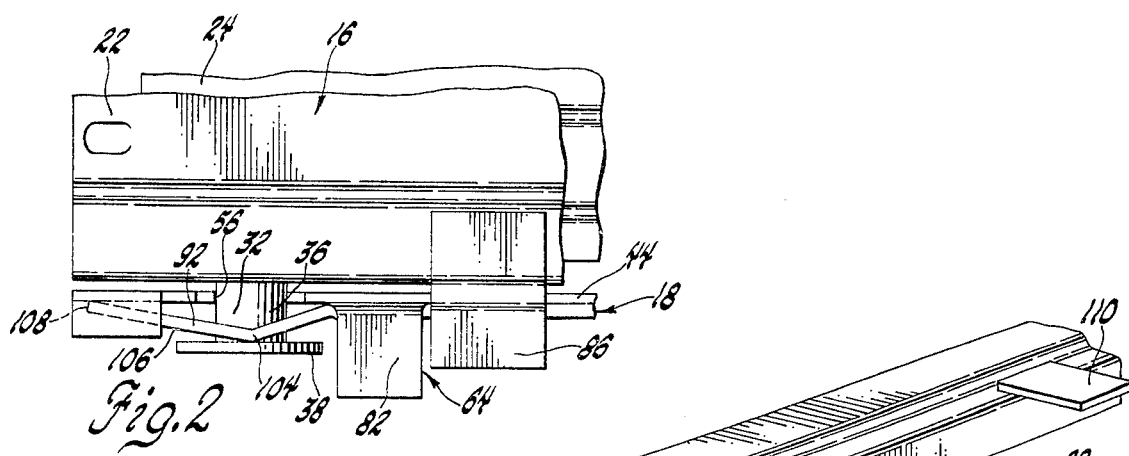
FIG. 2 is a sectional view taken in the direction of arrows 2—2 of FIG. 1.

As best seen in FIG. 3, the slide lock member 64 has a blocking portion 92 which moves across the upwardly opening slot 56 as the slide lock member 64 is moved rearwardly. As best seen in FIG. 1, the bottom surface of the blocking portion 92 includes a lead-in cam surface 94 and a locking cam surface 96. The lead-in cam surface 94 guides the slide lock member 64 over the shank 36 of the headed stud 32 and then the locking cam surface 96 forcefully engages the shank portion 36 to trap the headed stud 32 in the slot 56. The blocking portion 92 also has a lead-in cam surface 98 on its upper surface which guides the blocking portion 92 beneath a laterally projecting hold-down tab 100 of the upstanding leg 48. As seen in FIG. 1, the blocking portion 92 is wedged beneath the hold-down tab 100 and against the shank portion 32 of the headed stud 38 to securely attach the lower track 24 to the mounting bracket 44. As best seen in FIG. 2, the blocking portion 92 is bent and an apex 104 is provided in the center thereof so as to provide a lead-in cam surface 106 along its face. As the blocking portion 92 is moved rearwardly, the lead-in cam surface 106 is engaged against the head 38 of the stud to urge the tip 108 of the blocking portion 92 into forced engagement of the upstanding leg 48 whereby the slide lock member 64 is retained in its rearward position. It will be apparent that each time the seat is moved fully rearward on the adjuster track assembly 16, the drive tab 86 will engage the upstanding lateral projection 82 to further the wedging of the blocking portion 92 against the headed stud 38.

It will be apparent that the slide lock member 66, which has like numerals, operates identically to the slide lock member 64. The slide lock member 66 is driven to its rearward locking position by a drive tab 110 attached to the upper track 22 and cooperates with a hold-down tab 112.

Thus it is seen that the invention provides a simplified boltless attachment of a vehicle seat and seat adjuster in a motor vehicle.

What is claimed is:

1. In a motor vehicle having a floor pan, a vehicle seat, and a seat adjuster having upper and lower slidably interengaged tracks to permit fore and aft movement of the seat, the improvement comprising: a mounting bracket attached to the floor pan and having an upwardly opening slot therein, a member on the lower track of the seat adjuster being receivable in the upwardly opening slot of the mounting bracket, a slide lock member slidably mounted on the mounting bracket for movement between a latched position in which the slide lock member captures the member of the lower track in the upwardly opening slot and an unlatched position in which the slide lock is moved away from the upwardly opening slot, and driving means on the upper track engageable with the slide lock member to move the slide lock member to latched position when the upper track is moved to its fully adjusted position on the lower track.

2. In a motor vehicle having a floor pan, a vehicle seat, and a seat adjuster for mounting the seat on the floor pan and having upper and lower slidably interengaged tracks to permit fore and aft movement of the seat, the improvement comprising: a mounting bracket attached to the floor pan and having an upwardly opening slot therein, pin means projecting laterally from the lower track of the seat adjuster, a slide lock member having a blocking portion and being slidably mounted on the mounting bracket for movement between an unlatched position permitting the seat and seat adjuster to be lowered onto the mounting bracket with the pin means received within the upwardly opening slot and a latched position in which the slide lock member engages the pin means to capture the pin means of the lower track in the upwardly opening slot, the upper track having a drive tab thereon engageable with the slide lock member to move the slide lock member to latched position when the upper track is moved to its fully adjusted position on the lower track, the blocking portion of the slide lock member having cam surfaces on its upper and lower edges, the cam surface on the lower edge of the blocking portion acting on the pin means to guide the slide lock member over and into engagement thereof, and tab means on the mounting bracket being engaged by the cam surface of the upper edge of the blocking member to cause the blocking portion to be wedged into engagement between the tab means and the pin means.

3. In a motor vehicle having a floor pan, a vehicle seat, and a seat adjuster for mounting the seat on the floor pan and having upper and lower slidably interengaged tracks to permit fore and aft movement of the seat, the improvement comprising: a mounting bracket attached to the floor pan and having an upwardly opening slot therein, a headed stud projecting laterally from the lower track of the seat adjuster and having a shank portion and a head portion, a slide lock member having a blocking portion and being slidably mounted on the mounting bracket for movement between an unlatched position permitting the seat and seat adjuster to be lowered onto the mounting bracket with the shank portion of the headed stud received in the upwardly opening slot and a latched position in which the slide lock member engages the shank portion of the headed stud to capture the headed stud of the lower track in the upwardly opening slot, the upper track having a drive tab thereon engageable with the slide lock member to move the slide lock member to latched position when the upper track is moved to its fully adjusted position on the lower track, the blocking portion being bent to provide an apex for engaging the head portion of the headed stud to forceably engage the blocking portion between the head portion of the stud and the mounting bracket whereby the slide lock member is locked in latched position.

* * * * *